April 15, 1969   A. R. WELLS ET AL   3,439,150
HEATING DEVICE HAVING A SPECIALLY POSITIONED
CONTROL THERMOSTAT THEREIN
Filed Aug. 30, 1966

INVENTORS.
ALTON R. WELLS
BY ROBERT M. WELLS

*Oldham & Oldham*

ATTYS.

United States Patent Office 3,439,150
Patented Apr. 15, 1969

3,439,150
HEATING DEVICE HAVING A SPECIALLY POSITIONED CONTROL THERMOSTAT THEREIN
Alton R. Wells, 4573 W. Trade Winds Ave., Lauderdale-by-the-Sea, Fla. 33308, and Robert M. Wells, 4371 Ira Road, Akron, Ohio 44308
Filed Aug. 30, 1966, Ser. No. 576,045
Int. Cl. H05b 3/06
U.S. Cl. 219—523         6 Claims

ABSTRACT OF THE DISCLOSURE

The heating device includes an electrical heater means comprising a cylindrically shaped metal enclosure having one closed end, a hollow insulation core within the metal enclosure and a resistance coil carried by the outer surface of the core. A thermostat is operatively positioned against the inner surface of the insulating core and means operatively connect the thermostat in series with the resistance coil for control of power supply thereto. Insulation embedment means are used to position the insulation core and thermostat within the metal enclosure.

---

This invention relates to heating devices, such as coffee percolators, charcoal starters and the like, and wherein an electric heater means is provided in a container or on another article and where a thermostat is positioned completely within the heater means for control of power supply thereto.

Heretofore many different types of heating devices, such as percolators, have been provided that include a self-contained heater means. In nearly all of these devices, it is necessary to provide a thermostat that is positioned in special heat flow relation to the container, or to the liquid contents of the container, for control of the heating action exerted upon the contents of the container by regulating the power supply to its heater means dependent upon the temperature sensed by the thermostat. Naturally the rates of heat flow to the thermostat under the heating conditions are important so that the calibrated thermostats properly sense the liquid temperature or one proportionate thereto and thereby control the heater action and the temperatures of the heated liquid so that excessive heating thereof does not occur. Also, these thermostats are the primary safety control in the liquid heating device, or other heater, to avoid overheating, burning, or charring of the heating device, or other damage as may occur thereto if it becomes excessively hot by power supply thereto at improper times, or under unusual or abusive operating conditions, such as when all of the liquid in the container has been evaporated.

It is the general object of the present invention to provide a new and improved heating device characterized by the presence of an electric heating means, or member that may extend upwardly into the container, which heating means has a control thermostat positioned within a hollow center portion or core thereof.

It is a further object of the invention to provide a liquid heating device, such as a coffee percolator, wherein a vertically extending electric heater means extends up into the container and is in contact with any liquid therein, and where a control thermostat is positioned completely within a hollow center portion of the electric heater means to control heat supply to the liquid in the percolator container by measurement of the temperatures existing within the heater means.

Another object of the invention is to position a control thermostat in a liquid heating container in special association with an electric heater means provided in the container contacting and heating any liquid received in such container, such thermostat being adapted to sense, rapidly and continuously, the temperature of the heater means and prevent excessive heating of the contents of the container or of the heater means.

A further object of the invention is to provide a novel and improved heater and control thermostat combination for use in a heating device to permit a rapid but controlled heating action.

The foregoing and other objects and advantages of the present invention will be made more apparent as the specification proceeds.

Attention now is particularly directed to the accompanying drawings, wherein.

When referring to corresponding members shown in the drawings and referred to in the specification, corresponding numerals are used to facilitate comparison therebetween.

Figure 1:
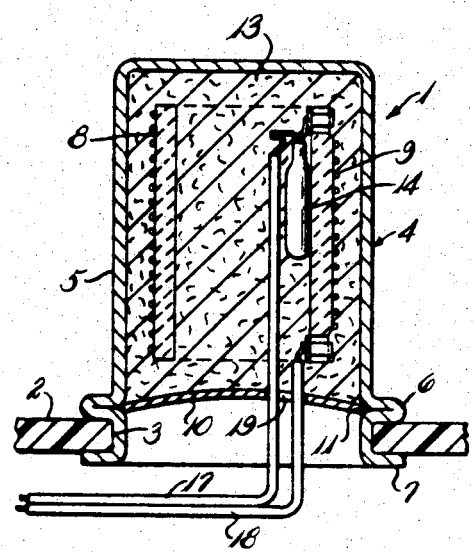
FIG. 1 is a vertical section of a liquid heating device embodying the principles of the invention, and where an electric heater means and associated members are shown in vertical section.
Figure 2:
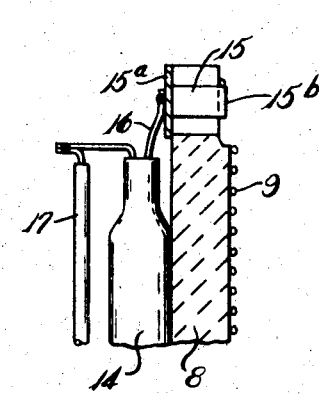
FIG. 2 is a fragmentary enlarged vertical section of the connection of a thermostat to an electric heater.

The present invention, as one embodiment thereof, relates to heating devices wherein they comprise the combination of a carrier means, an electric heater means operatively attached to the carrier means and extending vertically upwardly therefrom, which electric heater means has a hollow center and will be in contact with any liquid received in the carrier means if it comprises a container means, a thermostat operatively positoned completely wthin the hollow center of the electric heater means, and wire means operatively connecting said thermostat in series with the heater means for controlled power supply thereto, the thermostat being controlled by the temperature existing within the electric heater means.

In the present invention, it will be realized that any known types of carrier means which are made from either metal, or plastic materials, or combinations thereof, or other suitable materials, can be used to position the heater. Heater means are frequently attached to containers to heat the contents threof. These containers can have any desired type of a base, or support means provided therefor. In general, any container means used with the liquid heating device of the invention can be of any known construction, and these devices can be of a portable, or fixed nature, as desired. Conventional liquid pump means, coffee carriers, etc. can be associated with the heater means to complete the container of the invention when used as a coffee percolator.

Attention now is particularly directed to the details of the structures shown in the accompanying drawings, and the heating device of the invention is indicated as a whole by the numeral 1. Only a portion of the bottom of a container 2 is shown that forms the carrier means for the heater and in this instance comprises a container in which liquid to be heated is received. This container 2 can be of any desired design, and is made of a suitable size. The container 2 includes a bottom section, or a bottom wall that has an aperture 3 formed therein. The container can be made from a plastic material or metal, or combinations thereof, as desired.

In order to seal the aperture 3 and to provide a self-contained heat source for use in the heating device 1, a metal heater means, or unit 4 is provided. This heater means 4 has a metal enclosure or can 5 in which the actual heater element is poistioned. The enclosure 5 is shown as provided with a double thickness unitary flange 6 adjacent the lower end thereof that engages the upper surface of the container bottom, while the lower end of the enclosure 5 is outwardly flanged at 7 to engage the lower surface of the container 2. Such flange 7 is formed in any conventional manner by spinning, upsetting, rolling, or otherwise deforming the metal forming the open lower end of the enclosure 5, and which initially would be extending axially downwardly therefrom when the enclosure is engaged with the eaperture 3 in the container bottom. When desired, suitable gasket means can be associated with the enclosure 5 and the flange 6 thereof to aid in forming a liquid tight seal with the container. However, in many instances, a satisfactory seal is obtained merely by the physical deformation provided in the metal enclosure by proper formation of the lower end flange 7 thereon after the flange has been brought into engagement with the container bottom. It is within the concept of the invention to secure this heater means 5 to the container bottom 3 in any known manner, and thus, if the container is made from metal, the flange 6 could be welded, for example, to the container bottom, or it is possible to form a substantially radially outwardly extending flange at the lower end of the enclosure 5 and have such flange extend out and be suitably attached to the container 2 at some remote area, as desired.

In all events, the heater means 4 may be of the general type shown in United States Patents Nos. 2,817,068 and 2,864,929. These heaters include a porcelain or other insulator core 8 on which a resistance or heater wire 9 is wound. The heater 4 as shown also preferably is provided with a metal bottom plate 10 which is shown as having a concave lower face and with such end plate 10 being snapped or forced into engagement with a small circumferentially extending groove 11 formed at the base of the double walled flange 6. In assembly, sufficient pressure can be exerted on the end plate 10 to force it axially into the lower end of the enclosure 5 and obtain, by careful insertion of the end plate 10, a seating of the peripheral portions of the end plate into the groove 11 for permanent engagement of the end plate with the enclosure 5, as the plate is larger in diameter than the internal diameter of the enclosure. The core 8, with the resistance coil 9 thereon, is positioned in the enclosure 5 in a conventional manner, for example, by the insulation and positioning method generally disclosed in United States Patent No. 3,050,833, whereby an insulative but heat conductive embedment 13 is provided within the enclosure 5 to secure the core 8 in a fixed position therein, and to retain the convolutions of the coil 9 in fixed positions. Such embodiment 13 usually extends across the closed upper end of the enclosure 5, as indicated in FIG. 1. The bottom or end plate 10 may be of the construction shown in the co-pending application Ser. No. 358,821, filed by Rudolph Himelsbaugh.

As an important feature of the present invention, a thermostat 14, which is of a conventional design, is positioned within the hollow center of the core 9. In this instance, the thermostat 14 is attached to a terminal 15 of the resistance coil 9 that is secured to and extends through a slot formed in the core 8. Such terminal or clip 15 may be of the types shown in U.S. Patents Nos. 2,817,068 or 2,864,929 and it engages the core 8 by foot portions 15a and 15b on the terminal. The terminal 15 is suitably secured to an end of the resistance coil 9. Usually the thermostat 14 has leads only extending from the upper end thereof, and a bar or terminal strip 16 is shown suitably secured, as by welding, to the terminal 15 to position the thermostat within the core 8 and against its inner wall. A pair of power supply leads 17 and 18 are provided, which leads extend through a hole 19 formed in the end plate 10 and with the lead 18 connecting to one end of the resistance coil 9, whereas the lead 19 connects to the second lead or terminal of the thermostat 14. Thus the thermostat is connected in series with the resistance coil 9 for control of power supply thereto and to provide one control for the heating action of the heater means 4. It will be realized that if it is desired to have a plurality of heating coils in the heater means 4, then the thermostat used in the apparatus of the invention can be connected in any desired relationship with one or more of these heater coils for controlling the operation of the heater means and heat flow to the contents of the liquid heating device of the invention.

By proper calibration of the thermostat 14, it is possible to regulate the flow of heat from the heater means and/or to the liquid contents received within the container 2 for desired controlled heating thereof. Hence, in normal operation of the heating device, the liquid supplied to the container 2 would more than cover the heater means 4 and heat provided by power supply to the resistance coil 9 flows through such coil through the embedment 13 and the metal enclosure 5 to the contents of the vessel or container. As the enclosure 5 is usually made from a metal which is a good heat conductor, such as aluminum, heat is withdrawn rapidly therefrom by the liquid in the container 2 to raise its temperature.

In one embodiment of the invention, where the enclosure 5 was made from a metal having low heat conductivity characteristics, such as stainless steel, very good results were obtained. In a test, it was possible to use a heater means 4 that was rated at 490 watts within a container that was used for coffee percolating action and had a capacity of 5 cups. The thermostat 14 was set to open at temperatures of approximately 450° F. existing within the core 8 whereas the heat flow to the contents of the vessel was such as to maintain them at no higher than approximately a controlled percolating temperature of between about 180° and 190° F. Heat is rapidly transferred to the contents of the container even with a low rate of heat conductivity in the metal heater enclosure.

It should be noted that in electrical heaters like those to which the present invention relates, the temperature within the heater at the top thereof can go as high as 900° to 1200° F. where a stainless steel metal case is provided for the heater. Thus, it is possible to have a relatively high wattage, such as 600 to 1000 watts, provided by the main, or only heater coil and to have the thermostat 14 connected in association with the main heater coil for opening such coil when this relatively high but necessary heat condition is set up in the heater unit for rapid transmission of heat therefrom. In such instances, obviously the thermostat 14 will only open at a predetermined calibration such as, for example, 1000° F. The thermostat 14 will open and close dependent upon whether the temperature thereadjacent is above, or below, respectively, its calibrated temperature so as to provide a pulsating power supply to the resistance coil in the heater unit for heat supply to any associated article or means.

Figure 3:
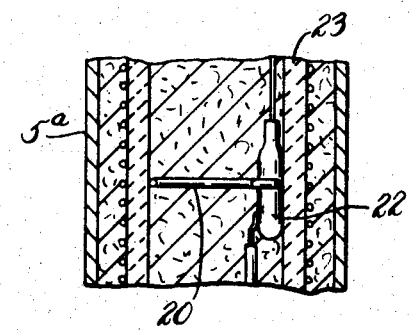
FIG. 3 is a fragmentary vertical section, like FIG. 2, of a modification of the invention showing an assembly in which the control thermostat is positioned in the heater member intermediate the ends thereof.
Figure 4:
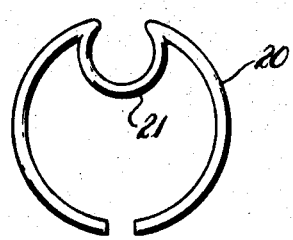
FIG. 4 is a plan of the positioning ring of FIG. 3.

In a modification of the heating device of the invention shown in FIG. 3, a heater means 5a is provided. In this instance, a split support ring 20 is provided that has an arcuate seat 21 formed therein to receive and position a thermostat 22 within the heater means 4a. The support ring 20 resiliently engages the inner wall of a core 23 for the resistance coil and the thermostat may be pressed against such core. The thermostat 22 is positioned substantially centrally of the length of the heater means 5a in good heat flow relationship with the resistance coil of the heater means so that wherever heat is not withdrawn rapidly enough from the resistance coil through its enclosure can, the thermostat will be heated to such temperature as is required to terminate power supply to the heater means by opening the normally closed thermostat circuit and avoid excessive heating of the heater or articles thereadjacent.

In the present invention, the calibration of the control thermostat used in the apparatus of the invention can be varied widely dependent upon its particular relationship to the actual heater means, and to the construction of or composition of the metal heater can. Thus, when the metal heater can is made from stainless steel, the heat provided tends to be confined in the can to a greater degree and the heater core or center thus has a higher operative temperature than if the metal can would be made of aluminum as such metal tends to lose its heat more readily under the same operating conditions than a stainless steel can, so that different calibrations would be required in the thermostats used in similar heaters made from metals having different heat flow characteristics.

It will be realized that the thermostat means provided by the invention are being positioned completely within an electrically insulated chamber in the heater which is of conventional size and can be secured to a container or other carrier in a known manner. The tubular member on which the resistance core is wound is made from a ceramic, or other insulating means, and this permits the safe use of a thermostat, such as the thermostat 22, that has a so-called live case. This type of a thermostat is less costly than a different type of a thermostat having a "dead case" construction where the casing of the thermostat is insulated from the thermostat circuit. However, any conventional thermostat can be used in the practice of the invention except those, such as mercury-type thermostats, which are not suitable for movement when the device to which they are attached is in operation.

The characteristics of the resistance heating coil of the invention could be altered appreciably, for example, by winding the resistance coil only at the upper end of the heater core (and heater can) and then positioning the thermostat adjacent the lower portion of the heater enclosure. By providing insulation in the heater core between the upper end of the heater, and the thermostat which would be adjacent the lower end of the heater core, the control or operating temperature for the thermostat can be further lowered.

When the thermostat is positioned within the heater can, usually near the upper end thereof, it will terminate heat flow to the appliance of the invention when the heater core reaches a pre-set temperature. Hence for example, if only a small amount of liquid is present in the container and the upper end of the heater can is exposed, the thermostat will sense any excessive heater temperature so that a self-protecting, or self-regulating action is obtained by the unit of the invention. The thermostat provides a faster heat sensitivity of the heater coil in the novel heater of the invention because of the improved positioning of the thermostat 14 and 22 in the heater. The thermostats 14 and 22 in general sense the temperature of the heater coil and particularly will sense the temperature of the oven formed within the heater core. Heat flows to the thermostats from the heater coil by radiation and by direct conduction through the heater core 8, for example, for rapidly effecting the thermostat by any excessive temperature of the heater coil.

The heater can 5 can be made of minimum length determined by the length of the heater core 8 and still obtain an improved control action by the electric heater of the invention.

The clip or support means 20 can engage a thermostat in any suitable manner to secure it within an insulation core at any desired portion thereof.

In any embodiments of the invention, when desired, the hollow bore or center portion of the core or cylinder on which the resistance coil is wound can be completely filled with the same sand type of embedment material, or other insulation means as is used to secure a member, such as the insulating core 8, in position in FIG. 1. The insulation means within the core 8 can be of any conventional composition and it aids in positioning the thermostat 14 against the wall of the core 8 when and if insulation is used in the core. The unit shown in FIG. 3 particularly does not need any such core filling insulation.

It will be realized that the actual means used to position the improved heating device of the invention in, to, or on an appliance can be of any known construction and any known materials can be used to secure this heater member in operative relationship to a carrier means.

While several complete embodiments of the invention have been disclosed herein, it will be appreciated that modification of these particular embodiments of the invention may be resorted to without departing from the scope of the invention as defined in the appended claims.

What is claimed is:
1. A heating device comprising
   an electric heater means including a cylindrically shaped metal enclosure having one closed end, a hollow insulation core positioned within the metal enclosure, and a resistance coil coiled along the outer surface of the insulating core,
   a thermostat operatively positioned within and against the inner surface of said insulating core in heat flow relation to the resistance coil,
   means operatively connecting said thermostat in series with said resistance coil for connection to a power supply means for power supply to said resistance coil dependent upon the temperature existing within said electric heater means, and
   said insulation core being positioned in said metal enclosure by a heat conductive, electrical insulation embedment which also engages and positions said thermostat, said resistance coil being positioned by and insulated from said metal enclosure by the insulation embedment.

2. A heating device as in claim 1 where a wire clip is positioned resiliently within said insulation core intermediate the ends thereof, said wire clip having an arcuate section therein receiving said thermostat and securing it to said insulation core.

3. A heating device as in claim 1 where a resilient clip is positioned within said core intermediate the ends thereof and it engages said thermostat and secures it against the inner wall of said core.

4. A heating device as in claim 1 where said resistance coil is positioned on the periphery of said core only on the upper portion thereof and said thermostat is positioned against the wall of said core at the lower portion thereof, and insulation means are positioned in said core vertically between said resistance coil and said thermostat.

5. A heating device as in claim 1 where a terminal means is provided for at least one end of said resistance coil and it extends through said insulating core, and a terminal extends from said thermostat and is secured to said terminal means to connect said thermostat thereto and to position said thermostat within said resistance coil prior to the formation of said embedment.

6. A heating device comprising
   an electric heater means including a cylindrically shaped metal enclosure having one closed end, a hollow insulation core positioned within the metal enclosure, and a resistance coil coiled along the outer surface of the insulating core,
   a thermostat operatively positioned within and against the inner surface of said insulating core in heat flow relation to the resistance coil,
   means operatively connecting said thermostat in series with said resistance coil for connection to a power supply means for power supply to said resistance coil dependent upon the temperature existing within said electric heater means,
   said insulation core being positioned in said metal enclosure by an insulation embedment, said resistance coil also being positioned by and insulated from said metal enclosure by said insulation embedment, and
   a wire clip being positioned resiliently within said insulation core intermediate the ends thereof, said wire clip having an arcuate section therein receiving said thermostat and securing it to said insulation core.

(References on following page)

References Cited

UNITED STATES PATENTS

| | | | |
|---|---|---|---|
| 1,848,449 | 3/1932 | Wiegand | 219—437 |
| 1,995,355 | 3/1935 | Koerner | 236—1 |
| 2,789,201 | 4/1957 | Sherwin | 219—523 |
| 2,817,068 | 12/1957 | Schwing | 339—221 |
| 2,864,929 | 12/1958 | Schwing | 219—523 |
| 2,888,547 | 5/1959 | Saper | 219—523 |
| 2,907,860 | 10/1959 | Geller | 219—523 X |
| 2,955,185 | 10/1960 | Cox | 310—8.9 X |
| 3,277,277 | 10/1966 | Wells | 219—441 |
| 3,303,327 | 2/1967 | Himelsbaugh | 219—544 |

VOLODYMYR Y. MAYEWSKY, *Primary Examiner.*

U.S. Cl. X.R.

219—441, 510, 536, 544; 339—221